3,122,561
1-(2-THENYL)-2-DI-LOWER ALKYLAMINO-
ETHYL DIPHENYLACETATE AND RELATED
COMPOUNDS
Louis F. Cason, St. Paul, Minn., and Patrick H. Seay,
Kalamazoo, Mich., assignors to Tuskegee Institute,
Tuskegee, Ala., a corporation of Alabama
No Drawing. Filed Oct. 19, 1959, Ser. No. 847,066
7 Claims. (Cl. 260—332.2)

This invention pertains to novel chemical compounds and a process for their preparation. More particularly, the invention pertains to 1-(2-thenyl)-2-aminoethyl esters of diphenylacetic acid. The compounds of the invention in the form of their free bases are represented by the following general structural formula

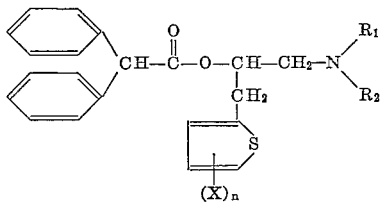

wherein X is a halogen atom having an atomic weight from 35 to 80, $n$ is an integer from 0 to 1, $R_1$ and $R_2$ taken separately represent lower-alkyl radicals, for example, methyl, ethyl, propyl, butyl, amyl, hexyl, heptyl, octyl, and isomeric forms thereof, and $R_1$ and $R_2$ taken together with —N< represent a saturated heterocyclic radical containing from 5 to 7 atoms in the ring, one of which, in addition to the amino nitrogen, is selected from the group consisting of carbon, nitrogen, oxygen, and sulfur, the other ring atoms being carbon, for example, piperidino, 4-propylpiperidino, pyrrolidino, 2,2-dimethylpyrrolidino, hexamethyleneimino, 2-methylhexamethyleneimino, morpholino, 2-methylmorpholino, thiamorpholino, 4-methylpiperazino, and the like. The novel compounds of the invention also include the acid addition salts of the foregoing free base compounds.

In accordance with the process of the invention, the novel compounds represented by Formula I above are prepared by condensing metallo-thiophene (or a monochloro or monobromo substituted metallo-thiophene) with an N, N-disubstituted-2,3-epoxypropylamine to produce a 1-(2-thenyl)-2-aminoethanol having the following general structural formula

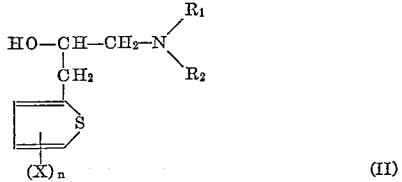

wherein X, $n$, and $R_1$ and $R_2$ are as defined in Formula I, and reacting the 1-(2-thenyl)-2-aminoethanol thus formed with a diphenylacetylating agent, illustratively, diphenylacetyl halide (e.g., diphenylacetyl chloride).

Advantageously, the novel 1-(2-thenyl)-2-aminoethanol intermediates of Formula II are obtained by an addition reaction beween a 2,3-epoxypropylamine of the kind noted above, illustratively, N-(2,3-epoxypropyl)diethylamine, N-(2,3-epoxypropyl)pyrrolidine, N-(2,3-epoxypropyl)piperidine, N-(2,3-epoxypropyl)-N-methylhexylamine, N-(2,3-epoxypropyl)morpholine, N-(2,3-epoxypropyl)thiamorpholine, N-(2,3-epoxypropyl)-2,2-dimethylpyrrolidine, and the like, with 2-thienyllithium or a halo-2-thienyllithium.

The 2-thienyllithium or chloro(or bromo)-2-thienyllithium is prepared by reacting thiophene or chloro- or bromo-substituted thiophenes with butyllithium according to the method of Gilman and Shirley, J.A.C.S. 71, 1870 (1949). Alternatively, 5-chloro-2-thienyllithium can also be prepared by reacting 2,5-dichlorothiophene with butyllithium.

2,3-epoxypropylamines of the kind mentioned are obtained by known methods. For example, one can react an epihalohydrin such as epichlorohydrin with a secondary amine, for example, diethylamine, pyrrolidine, piperidine, N-methylhexylamine, morpholine, thiamorpholine, 2,2-dimethylpyrrolidine, and the like, to obtain a desired 2,3-epoxypropylamine.

The reaction of the 2,3-epoxypropylamine and a 2-thienyllithium is exothermic, and it is preferred to mix the reactants slowly and cautiously in the presence of an inert solvent. The reaction proceeds satisfactorily from about 0° C. to about 125° C., preferably from about 25° C. to about 75° C. Generally, the reaction can be readily controlled by slowly adding one of the reactants to a solution of the other in an inert organic solvent, for example, ether, technical hexane (Skellysolve B), and like solvents. Frequently, it is particularly convenient to adjust the rate of addition so as to maintain the reaction mixture at a gentle reflux. Advantageously, the 2,3-epoxypropylamine is added to a solution of a 2-thienyllithium, in which case it is convenient to utilize the reaction mixture obtained in the preparation of the 2-thienyllithium without separating and purifying the latter. After the reaction of the 2,3-epoxypropylamine and the 2-thienyllithium is completed, any lithium complexes that have been formed are decomposed by treating with water or a dilute aqueous acid, illustratively, 10% aqueous sulfuric acid, and the like. The resulting 1-(2-thenyl)-2-aminoethanol of Formula II is recovered and purified if so desired by conventional methods known in the art, illustratively, by solvent extraction, vacuum distillation, etc.

The novel 1-(2-thenyl)-2-aminoethyl diphenylacetates of the invention are obtained by reacting a diphenylacetylating agent, preferably a diphenylacetyl halide (e.g., diphenylacetyl chloride) with a 1-(2-thenyl)-2-aminoethanol in the presence of an inert organic solvent, for example, benzene, ether, toluene, tetrahydrofuran, and the like. An acid acceptor, for example, pyridine, triethylamine, and the like can be included in the reaction mixture in order to react with the hydrogen halide that is produced by the reaction. If an acid acceptor is not included, the compounds can be recovered in the form of their hydrohalide acid addition salts, or they can be recovered in their free base form by neutralizing the reaction mixture with alkali and extracting the free base with an organic solvent, for example, ether.

The acid addition salts of the free bases (Formula I, above) are obtained by reacting said free bases with an acid, illustratively, pharmacologically acceptable acids, for example, hydrochloric, hydrobromic, sulfuric, phosphoric, sulfamic, acetic, lactic, tartaric, gluconic, citric, benzoic, salicylic, and like acids.

The novel 1-(2-thenyl)-2-aminoethyl diphenylacetates of this invention, in free base form or in the form of acid addition salts with pharmacologically acceptable acids, possess valuable pharmacological activity. Illustratively, the compounds of the invention are drug potentiators and tranquilizing agents. Thus they can be used to prolong the activity of anesthetics, analgetics, sedatives and hypnotics. More particularly, the compounds are useful for prolonging hexobarbital-induced sleep in mammals. For example, the effectiveness of 1-(2-thenyl)-2-diethylaminoethyl diphenylacetate hydrochloride in prolonging hexobarbital-induced sleep is illustrated in Table I. Test mice weighing 20 to 25 g. each were given various dosages of 1-(2-thenyl)-2-diethylaminoethyl diphenylacetate hydrochloride. After the designated interval (30 minutes to 120 minutes), each received, intraperitoneally, 100 mg./kg. of hexobarbital sodium. The subsequent duration of sleep was recorded, and the results are presented as an average prolongation (in percent) over the sleep duration of control mice receiving only hexobarbital sodium at 100 mg./kg. There were six mice in each group.

TABLE I

| Route of Administration | Interval after Administration, minutes | Percentage Increase in Sleeping Time at Various Dosage-Proportions of $LD_{50}$[1] (in percent) | | | | |
|---|---|---|---|---|---|---|
| | | 40 | 20 | 10 | 5 | 2.5 |
| Intraperitoneal | 30 | | 788 | 666 | 329 | 440 |
| Oral | 30 | 1,155 | 891 | | | |
| Oral | 60 | 976 | 678 | | | |
| Oral | 120 | 1,010 | 1,102 | | | |

[1] $LD_{50}$, 650 mg./kg.

The compounds have a very low atropine index [for example, 1-(2-thenyl)-2-diethylaminoethyl diphenylacetate hydrochloride has an atropine index of <1/100], and therefore they cause no substantial anticholinergic side-effects such as dryness of the mouth, blurring of vision, constipation, tachycardia, etc.

Furthermore, the compounds of the invention are useful, in accordance with U.S. Patents 1,915,334 and 2,075,359, in forming amine fluosilicate mothproofing agents, and in accordance with U.S. Patents 2,425,320 and 2,606,155, in forming amine thiocyanate-formaldehyde condensation products for use as pickling inhibitors.

When used in therapy, the novel compounds of the invention, in the free base form or in the form of acid addition salts with pharmacologically acceptable acids, can be combined with solid or liquid pharmaceutical carriers and formulated in the form of tablets, powder packets, or capsules, using starch and like excipients, or dissolved or suspended in suitable solvents or vehicles for oral or parenteral administration.

The following examples are illustrative of the process and products of the present invention but are not to be construed as limiting.

*Example 1.—Preparation of 1-(2-Thenyl)-2-Diethylaminoethyl Diphenylacetate Hydrochloride*

PART A.—PREPARATION OF 1-(2-THENYL)-2-DIETHYLAMINOETHANOL

To an ether solution containing 0.43 mole of butyllithium was added 50.4 g. (0.6 mole) of redistilled thiophene in 50 ml. of ether. After stirring at room temperature for ½ hour, the reaction mixture was heated and stirred at reflux temperature for 3 hours, whereupon 78 g. (0.6 mole) of N-(2,3-epoxypropyl)diethylamine in 75 ml. of ether was added dropwise. The heat of reaction was sufficient to maintain the mixture at reflux temperature. When the reaction was completed (evidenced by a negative test for the starting organolithium compound), the addition complex thus obtained was hydrolyzed by adding cold 10% aqueous sulfuric acid. The acidified reaction mixture separated into two layers, and the ether layer was extracted with several portions of 10% aqueous sulfuric acid. The original acid layer and the acid extracts were combined, neutralized with 40% aqueous sodium hydroxide, and extracted with ether, and the ether extract was dried over anhydrous potassium carbonate. The dry ether solution was filtered and distilled, with the 1-(2-thenyl)-2-diethylaminoethanol being collected at a boiling point of 121° to 122° C. at 6 mm. mercury pressure. The product weighed 65 g. (71%); its density ($D_4^{20}$) was 1.0226 and its refractive index ($n_D^{24}$) was 1.5106.

*Analysis.* — Calculated for $C_{11}H_{19}NOS$: N, 6.56. Found: N, 6.54, 6.36.

PART B.—PREPARATION OF 1-(2-THENYL)-2-DIETHYLAMINOETHYL DIPHENYLACETATE HYDROCHLORIDE

A mixture of 5.4 g. (0.025 mole) of 1-(2-thenyl)-2-diethylaminoethanol (Part A) and 5.5 g. (0.025 mole) of diphenylacetyl chloride in 50 ml. of benzene was refluxed for 2 hours. The benzene was removed by distillation, and the residue was recrystallized from ethyl acetate. There was thus obtained 9.5 g. (86%) of solid 1-(2-thenyl)-2-diethylaminoethyl diphenylacetate hydrochloride. After another recrystallization from ethyl acetate the compound had a melting point of 139.5° to 140.5° C. and gave the following analysis:

Calculated for $C_{25}H_{30}ClNO_2S$: C, 67.62; H, 6.81; N, 3.16; Cl, 7.98; S, 7.21. Found: C, 67.62; H, 6.63; N, 3.36; Cl, 8.14; S, 7.16.

*Example 2.—Preparation of 1-(2-Thenyl)-2-Diethylaminoethyl Diphenylacetate and Hydrochloride Thereof*

1200 g. (5.6 moles) of 1-(2-thenyl)-2-diethylaminoethanol and 1355 g. (5.9 moles) of diphenylacetyl chloride were mixed in 6 l. of benzene, and heated under reflux for 3 hours. 100 g. of charcoal was added and heating was continued for an additional 15 minutes. The hot reaction mixture was then filtered through diatomite (Celite) in a preheated funnel. The filtrate became cloudy as soon as it began to cool, and it was refrigerated overnight. The resulting semi-solid mass was filtered under reduced pressure for 4 hours in order to remove the solvent. The filter cake thus obtained was slurried with about an equal volume of anhydrous ethyl acetate and the slurry was filtered. The filter cake was washed with sufficient ethyl acetate to remove all color. The white, crystalline 1-(2-thenyl)-2-diethylaminoethyl diphenylacetate hydrochloride, after being dried overnight at 37° C. and for one hour in an oven at 60° C., had a melting point of 138° to 140° C. 100 g. of the compound was dissolved in 2.5 l. of water, and the solution was made basic (about pH 9) with 40% aqueous sodium hydroxide. The mixture was then extracted with ether. The ether extract was washed three times with water, dried over anhydrous potassium carbonate, and the ether was evaporated. 1-(2-thenyl)-2-diethylaminoethyl diphenylacetate was thus obtained as the free base.

*Example 3.—Preparation of 1-(2-Thenyl)-2-Dioctylaminoethyl Diphenylacetate Hydrochloride*

PART A.—PREPARATION OF 1-(2-THENYL)-2-DIOCTYLAMINOETHANOL

Following the procedure of Example 1, Part A, but substituting N-(2,3-epoxypropyl)dioctylamine for N-(2,3-epoxypropyl)diethylamine, 1-(2-thenyl)-2-dioctylaminoethanol was prepared.

PART B—PREPARATION OF 1-(2-THENYL)-2-DIOCTYLAMINOETHYL DIPHENYLACETATE HYDROCHLORIDE

Following the procedure of Example 1, Part B, but substituting 1-(2-thenyl)-2-dioctylaminoethanol for 1-(2-thenyl)-2-diethylaminoethanol, 1-(2 - thenyl) - 2 - dioctylaminoethyl diphenylacetate hydrochloride was prepared.

*Example 4.—Preparation of 1-(5-Chloro-2-Thenyl)2-Diethylaminoethyl Diphenylacetate Hydrochloride*

PART A.—PREPARATION OF 1-(5-CHLORO-2-THENYL)-2-DIETHYLAMINOETHANOL

Following the procedure of Example 1, Part A, but substituting 2,5-dichlorothiophene for thiophene, 1-(5-chloro-2-thenyl)-2-diethylaminoethanol was prepared.

PART B.—PREPARATION OF 1-(5-CHLORO-2-THENYL)-2-DIETHYLAMINOETHYL DIPHENYLACETATE HYDROCHLORIDE

Following the procedure of Example 1, Part B, but substituting 1-(5-chloro-2-thenyl)-2-diethylaminoethanol for 1-(2-thenyl)-2-diethylaminoethanol, 1-(5-chloro-2-thenyl)-2-diethylaminoethyl diphenylacetate hydrochloride was prepared.

*Example 5.—Preparation of 1-(2-Thenyl)-2-Pyrrolidino- ethyl Diphenylacetate Hydrochloride*

PART A.—PREPARATION OF 1-(2-THENYL)-2-PYRROL- IDINO-ETHANOL

Following the procedure of Example 1, Part A, but substituting N-(2,3-epoxypropyl)pyrrolidine for N-(2,3-epoxypropyl)diethylamine, 1-(2-thenyl) - 2 - pyrrolidino- ethanol was prepared.

PART B.—PREPARATION OF 1-(2-THENYL)-2-PYRROL- IDINOETHYL DIPHENYLACETATE HYDROCHLORIDE

Following the procedure of Example 1, Part B, but substituting 1-(2-thenyl)-2-pyrrolidinoethanol for 1-(2-thenyl)-2-diethylaminoethanol, 1-(2-thenyl) - 2 - pyrrolidinoethyl diphenylacetate hydrochloride was prepared.

*Example 6.—Preparation of 1-(2-Thenyl)-2-(4-Propyl- piperidino)Ethyl Diphenylacetate Hydrochloride*

PART A.—PREPARATION OF 1-(2-THENYL)-2-(4- PROPYLPIPERIDINO)ETHANOL

Following the procedure of Example 1, Part A, but substituting N-(2,3-epoxypropyl)-4-propylpiperidine for N-(2,3-epoxypropyl)diethylamine, 1-(2-thenyl) - 2 - (4-propylpiperidino)ethanol was prepared.

PART B.—PREPARATION OF 1-(2-THENYL)-2-(4-PRO- PYLPIPERIDINO)ETHYL DIPHENYLACETATE HY- DROCHLORIDE

Following the procedure of Example 1, Part B, but substituting 1-(2-thenyl)-2-(4-propylpiperidino)ethanol for 1-(2-thenyl)-2-diethylaminoethanol, 1-(2-thenyl)-2-(4-propylpiperidino)ethyl diphenylacetate hydrochloride was prepared.

*Example 7.—Preparation of 1-(2-Thenyl)-2-Hexamethyl- eneiminoethyl Diphenylacetate Hydrochloride*

PART A.—PREPARATION OF 1-(2-THENYL)-2- HEXAMETHYLENEIMINOETHANOL

Following the procedure of Example 1, Part A, but substituting N-(2,3-epoxypropyl)hexamethyleneimine for N-(2,3-epoxypropyl)diethylamine, 1-(2-thenyl)-2-hexa- methyleneiminoethanol was prepared.

PART B.—PREPARATION OF 1-(2-THENYL)-2-HEXA- METHYLENEIMINO DIPHENYLACETATE HYDRO- CHLORIDE

Following the procedure of Example 1, Part B, but substituting 1-(2-thenyl) - 2 - hexamethyleneiminoethanol for 1-(2-thenyl)-2-diethylaminoethanol, 1-(2-thenyl)-2-hexamethyleneiminoethyl diphenylacetate hydrochloride was prepared.

*Example 8.—Preparation of 1-(2-Thenyl)-2-Morpholino- ethyl Diphenylacetate Hydrochloride*

PART A.—PREPARATION OF 1-(2-THENYL)-2- MORPHOLINOETHANOL

Following the procedure of Example 1, Part A, but substituting N-(2,3-epoxypropyl)morpholine for N-(2,3-epoxypropyl)diethylamine, 1-(2-thenyl) - 2 - morpholino- ethanol was prepared.

PART B.—PREPARATION OF 1-(2-THENYL)-2-MORPH- OLINOETHYL DIPHENYLACETATE HYDROCHLORIDE

Following the procedure of Example 1, Part B, but substituting 1-(2-thenyl)-2-morpholinoethanol for 1-(2-thenyl)-2-diethylaminoethanol, 1-(2-thenyl) - 2 - morpho- linoethyl diphenylacetate hydrochloride was prepared.

*Example 9.—Preparation of 1-(2-Thenyl)-2-Thiamorpho- linoethyl Diphenylacetate Hydrochloride*

PART A.—PREPARATION OF 1-(2-THENYL)-2-THIA- MORPHOLINOETHANOL

Following the procedure of Example 1, Part A, but substituting N-(2,3-epoxypropyl)thiamorpholine for N-(2,3-epoxypropyl)diethylamine, 1-(2-thenyl)-2-thiamor- pholinoethanol was prepared.

PART B.—PREPARATION OF 1-(2-THENYL)-2-THIA- MORPHOLINOETHYL DIPHENYLACETATE HYDRO- CHLORIDE

Following the procedure of Example 1, Part B, but substituting 1-(2-thenyl)-2-thiamorpholinoethanol for 1-(2-thenyl)-2-diethylaminoethanol, 1-(2-thenyl) - 2 - thia- morpholinoethyl diphenylacetate hydrochloride was pre- pared.

*Example 10.—Preparation of 1-(2-Thenyl)-2-(4-Methyl- piperazino)Ethyl Diphenylacetate Hydrochloride*

PART A.—PREPARATION OF 1-(2-THENYL)-2-(4-METH- YLPIPERAZINO)ETHANOL

Following the procedure of Example 1, Part A, but substituting N-(2,3-epoxypropyl)-4-methylpiperazine for N - (2,3-epoxypropyl)diethylamine, 1-(2-thenyl) - 2 - (4-methylpiperazino)ethanol was prepared.

PART B.—PREPARATION OF 1-(2-THENYL)-2-(4-METH- YLPIPERAZINO)ETHYL DIPHENYLACETATE HY- DROCHLORIDE

Following the procedure of Example 1, Part B, but substituting 1-(2-thenyl)-2-(4-methylpiperazino)ethanol for 1-(2-thenyl)-2-diethylaminoethanol, 1-(2-thenyl)-2-(4-methylpiperazino)ethyl diphenylacetate hydrochloride was prepared.

*Example 11*

Ten thousand (10,000) scored tablets for oral use, each containing 25 mg. of 1-(2-thenyl)-2-diethylamino- ethyl diphenylacetate hydrochloride, are prepared from the following types and amounts of ingredients:

| | G. |
|---|---|
| 1-(2-thenyl)-2 - diethylaminoethyl diphenylacetate hydrochloride | 250 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then com- pressed into tablets of the proper weight.

We claim:

1. The compound selected from the group consisting of: (1) free bases having the following structural for- mula

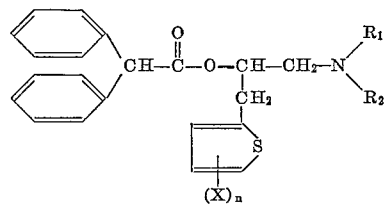

wherein X is a halogen atom having an atomic weight between 35 and 80, $n$ is an integer from 0 to 1, $R_1$ and $R_2$ taken separately represent lower-alkyl, and $R_1$ and $R_2$ taken together with $-N<$ represent saturated hetero- cycles of from 5 to 7 atoms in the ring selected from the group consisting of pyrrolidino, 2,2-dimethylpyrrolidi- no, piperidino, 4-propylpiperidino, hexamethyleneimino, 2-methylhexamethyleneimino, morpholino, 2-methylmor- pholino, thiamorpholino, and 4-methylpiperazino, and (2) acid addition salts thereof.

2. Compound selected from the group consisting of: (1) 1-(2-thenyl)-2-di-lower-alkylaminoethyl diphenylace- tate and (2) acid addition salts thereof.

3. 1-(2-thenyl) - 2 - diethylaminoethyl diphenylacetate hydrochloride.

4. 1-(2-thenyl)-2-diethylaminoethyl diphenylacetate.

5. The process for preparing compounds having the following structural formula:

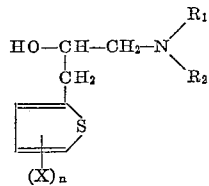

wherein X is a halogen atom having an atomic weight between 35 and 80, $n$ is an integer of from 0 to 1, $R_1$ and $R_2$ taken separately represent lower-alkyl, and $R_1$ and $R_2$ taken together with $-N{<}$ represent saturated heterocycles of from 5 to 7 atoms in the ring selected from the group consisting of pyrrolidino, 2,2-dimethylpyrrolidino, piperidino, 4-propylpiperidino, hexamethyleneimino, 2-methylhexamethyleneimino, morpholino, thiamorpholins, and 4-methylpiperazino, which comprises reacting 2,3-epoxypropylamine having the formula

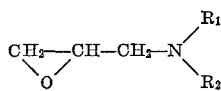

wherein $R_1$ and $R_2$ are as defined above with 2-thienyllithium having the formula

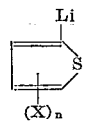

wherein X and $n$ are as defined above.

6. The process according to claim 5 wherein N-(2,3-epoxypropyl)-di-lower-alkylamine is reacted with 2-thienyllithium to produce 1-(2-thenyl)-2-di-lower-alkylaminoethanol.

7. Process according to claim 6 wherein N-(2,3-epoxypropyl)diethylamine is reacted with 2-thienyllithium to produce 1-(2-thenyl)-2-diethylaminoethanol.

References Cited in the file of this patent
UNITED STATES PATENTS
2,735,847    Blicke _____ Feb. 21, 1956

OTHER REFERENCES

Forneau et al.: Bull. Soc. Chim 4, 45, pp. 1172–1189 (1929).

Richter: Organic Chemistry, vol. III, Heterocyclic Compounds, P. Blakiston's Son & Co., Philadelphia, Pa. (1923), pp. 21–22.

Cook et al.: Journal of the Chemical Society (1936), pp. 71–72.

Kaye et al.: Journal of the American Chemical Society, vol. 74, pp. 3676–3679 (1952).

UNITED STATES PATENT OFFICE
CERTIFICATE OF CORRECTION

Patent No. 3,122,561                      February 25, 1964

Louis F. Cason et al.

It is hereby certified that error appears in the above numbered patent requiring correction and that the said Letters Patent should read as corrected below.

Column 5, lines 41 and 42, for "HEXAMETHYLENEIMINO" read -- HEXAMETHYLENEIMINOETHYL --; column 7, lines 23 and 24, for "morpholino, thiamorpholins" read -- morpholino, 2-methylmorpholino, thiamorpholino --.

Signed and sealed this 20th day of October 1964.

(SEAL)
Attest:

ERNEST W. SWIDER                            EDWARD J. BRENNER
Attesting Officer                               Commissioner of Patents